US006939085B1

(12) United States Patent
Posch

(10) Patent No.: US 6,939,085 B1
(45) Date of Patent: Sep. 6, 2005

(54) SOIL AERATING MACHINE

(76) Inventor: Gregory J. Posch, 39725 County Rd. 3, Holdingford, Stearns County, MN (US) 56341

( * ) Notice: Subject to any disclaimer, the term of this patent is extended or adjusted under 35 U.S.C. 154(b) by 75 days.

(21) Appl. No.: 10/719,160

(22) Filed: Nov. 21, 2003

Related U.S. Application Data

(60) Provisional application No. 60/428,789, filed on Nov. 21, 2002.

(51) Int. Cl.[7] .................................................. B09C 1/00

(52) U.S. Cl. ................. 405/269; 405/128.3; 405/128.1; 405/128.25; 405/128.15; 172/21

(58) Field of Search ......................... 405/128.1, 128.15, 405/128.25, 128.3, 269; 172/21; 111/118

(56) References Cited

U.S. PATENT DOCUMENTS 1,677,153 A 7/1928 Spencer
1,755,445 A 4/1930 Irish
1,814,445 A 7/1931 Irish
1,814,446 A 7/1931 Irish
2,083,153 A 6/1937 Irish
2,306,165 A 12/1942 Irish
2,323,773 A 7/1943 Irish
2,789,522 A 4/1957 Barton
3,148,643 A 9/1964 Mussett et al.
3,450,073 A 6/1969 Baker
3,546,886 A 12/1970 Jones et al.
3,608,318 A 9/1971 Levy et al.
4,233,915 A 11/1980 Kordon
4,429,647 A 2/1984 Zinck
4,566,543 A 1/1986 Kotani
4,570,553 A 2/1986 Ito
4,624,194 A 11/1986 Zinck
4,658,738 A 4/1987 Zinck
4,660,480 A 4/1987 Zinck
4,839,061 A * 6/1989 Manchak Jr. et al. ... 405/128.25
4,903,618 A 2/1990 Blair
4,945,988 A 8/1990 Payne et al.
5,006,017 A 4/1991 Yoshida et al.
5,032,042 A 7/1991 Schuring et al.
5,061,119 A 10/1991 Balthaus et al.
5,101,745 A 4/1992 Podevels et al.
5,107,895 A 4/1992 Pattison et al.
5,115,750 A 5/1992 White et al.
5,119,744 A 6/1992 Comer
5,123,782 A 6/1992 Yoshida et al.
5,131,472 A 7/1992 Dees et al.
5,133,625 A 7/1992 Albergo et al.
5,135,058 A 8/1992 Millgard et al.
5,160,220 A 11/1992 Yoshida et al.
5,178,078 A 1/1993 Pendergrass
5,207,168 A 5/1993 Comer
5,217,327 A 6/1993 Nakanishi
5,306,104 A 4/1994 Witherspoon
5,370,069 A 12/1994 Monroe
5,460,106 A 10/1995 Crockett et al.
5,487,346 A 1/1996 Taylor (Continued)

*Primary Examiner*—Frederick L. Lagman
(74) *Attorney, Agent, or Firm*—Albert W. Watkins

(57) ABSTRACT

A soil aerating machine includes in combination a skid-steer and a basket resembling a loader bucket adapted for attachment to the skid-steer boom. An air pressure tank, an elongate air nozzle pipe, an air hammer, and air control valves for the air nozzle pipe and air hammer are carried within the basket. The elongate air nozzle is attached to the basket using a pivotal bearing surface, which permits controlled motion therebetween. The air hammer is used to assist with the driving of the elongate air nozzle pipe into an earthen medium. A blast of air is then released through the air nozzle pipe into the earth, to loosen and aerate packed or clogged soil. A method of restoring a septic system using the preferred apparatus is also described, as are various alternative apparatus and method steps.

17 Claims, 3 Drawing Sheets

U.S. PATENT DOCUMENTS

| | | | | |
|---|---|---|---|---|
| 5,511,907 A | | 4/1996 | Tabasco | |
| 5,560,737 A | | 10/1996 | Schuring et al. | |
| 5,570,973 A | | 11/1996 | Hunt | |
| 5,623,886 A | | 4/1997 | Marangi | |
| 5,624,635 A | | 4/1997 | Pryor | |
| 5,631,160 A | | 5/1997 | Bruso | |
| 5,678,639 A | | 10/1997 | Golden | |
| 5,741,090 A | | 4/1998 | Dunning et al. | |
| 5,802,996 A | * | 9/1998 | Baxter | 111/118 |
| 5,810,514 A | | 9/1998 | Suchecki, Jr. | |
| 5,830,752 A | | 11/1998 | Bruso | |
| 5,868,523 A | | 2/1999 | Nickell et al. | |
| 5,888,021 A | | 3/1999 | Kawabata | |
| 5,908,267 A | | 6/1999 | Schuring et al. | |
| 5,944,454 A | | 8/1999 | Melegari | |
| 6,012,517 A | | 1/2000 | Schuring et al. | |
| 6,017,169 A | * | 1/2000 | Toor et al. | 405/128.45 |
| 6,049,942 A | * | 4/2000 | Johnson | 111/118 |
| 6,050,337 A | | 4/2000 | Melegari | |
| 6,182,586 B1 | | 2/2001 | Hunt et al. | |
| 2001/0002970 A1 | | 6/2001 | Pizzorni et al. | |
| 2001/0027869 A1 | | 10/2001 | Vought | |

* cited by examiner

SOIL AERATING MACHINE

CROSS REFERENCE TO RELATED APPLICATIONS

This application claims priority to U.S. provisional patent application Ser. No. 60/428,789 filed Nov. 21, 2002 entitled “Soil Aerating Machine” and invented by the present inventor.

BACKGROUND OF THE INVENTION

1. Field of the Invention

This invention pertains generally to the field of septic system maintenance, and more specifically to an apparatus useful in the restoration of failed or weakened septic systems.

2. Description of the Related Art

Septic systems are provided in many residences and businesses to safely manage solid and liquid wastes that may be produced. According to modern requirements, these systems are located relatively close to the top surface of the earth, in order to most efficiently utilize purification which is present in nature. A typical system may include a solids or settling tank, followed by a relatively expansive drain field. The drain field, depending upon local requirements, may be buried within a few feet of the surface of the ground. The drain field allows liquid wastes to be filtered by the soil and safely decomposed by natural soil micro-organisms.

Unfortunately, over time a drain field may become ineffective. This may be a result of the type of soil, and may be further aggravated by the wastes being generated by a source such as a household or business. The end result is normally highly compacted soil which is impervious to the passage of liquid, or which is sufficiently impervious that the drain field can no longer adequately drain at the rate at which liquid waste is being delivered. Heretofore, this would require the installation of new drain field components in virgin soil, or the removal of the drain field components, excavation of failed soil, and replacement of both soil and components. This is an expensive and disruptive process which would desirably be avoided where possible.

A number of patents illustrate systems, some which are related to the present invention and some which may not be, but all which nevertheless may offer various teachings of value in the implementation of the present invention and all which are incorporated herein by reference for those teachings, including U.S. Pat. Nos. 1,677,153; 1,755,445; 1,814,445; 1,814,446; 2,083,153; 2,306,465; 2,323,773; 2,789,522; 3,148,643; 3,546,886; 4,233,915; 4,429,647; 4,566,543; 4,570,553; 4,624,194; 4,658,738; 4,660,480; 4,903,618; 5,006,017; 5,101,745; 5,107,895; 5,115,750; 5,123,782; 5,160,220; 5,178,078; 5,217,327; 6,050,337; and 6,182,586. What is desired in the present invention is a system which avoids the replacement of drain fields where possible, and which instead extends the longevity of the existing system.

SUMMARY OF THE INVENTION

In a first manifestation, the invention is a soil aerating machine. According to this manifestation, a loader has a wheeled base for traveling over earth. A motive power plant provides motive power to the wheeled base. A loader boom is also driven by power derived from the motive power plant, and is operatively moveable with respect to the wheeled base. A means is provided for operatively attaching loader buckets and other attachments to said loader boom. A pneumatic pressure tank has an inlet receiving pressurized air from a pressurized air source and has an outlet. An air nozzle has an air inlet receiving pressurized air from the pneumatic pressure tank and has an air outlet that is operatively inserted into the earth and conducts pressurized air from air inlet into the earth adjacent the air outlet. A basket coupled to the attaching means and supporting said air nozzle.

In a second manifestation, the invention is a self-propelled land vehicle. The vehicle includes a motive power source, a base, a boom arm, and a coupling connected to the boom arm to which attachments may be engaged. According to this manifestation, the improvement comprises an air tube pivotally coupled to the boom arm and insertable into the earth at a second end distal to the boom arm coupling. A means provides a high pressure, high volume impulse of air to the air tube. A means controls an extent of insertion of said air tube into the earth. A further means controls the providing of said high pressure, high volume impulses of air to the air tube.

In a third manifestation, the invention is a method of restoring a septic system. According to the method, the steps include locating buried septic components; coupling a gas injection tube to a loader boom arm; inserting the gas injection tube into the earth adjacent the located buried septic components; providing a high pressure gas to the gas injection tube; withdrawing the gas injection tube from the earth; repositioning the loader boom arm to a new position adjacent the located buried septic components; and repeating the inserting, providing, and withdrawing steps subsequent to the repositioning step.

OBJECTS OF THE INVENTION

Exemplary embodiments of the present invention solve inadequacies of the prior art by providing a compact attachment to a skid steer or other loader which is attached to the loader boom arm.

A first object of the invention is to reduce the initial investment and unnecessary equipment required to aerate soil. A second object of the invention is to substantially enhance maneuverability and control over the placement of an earth penetrating air tube in the earth. Another object of the present invention is to provides high volume, high pressure air immediately adjacent a pivotally mounted earth penetrating air tube for optimal performance. A further object of the invention is to provide an improved method for the restoration of septic systems. Yet another object of the present invention is to provide the foregoing in a compact apparatus requiring minimal space.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
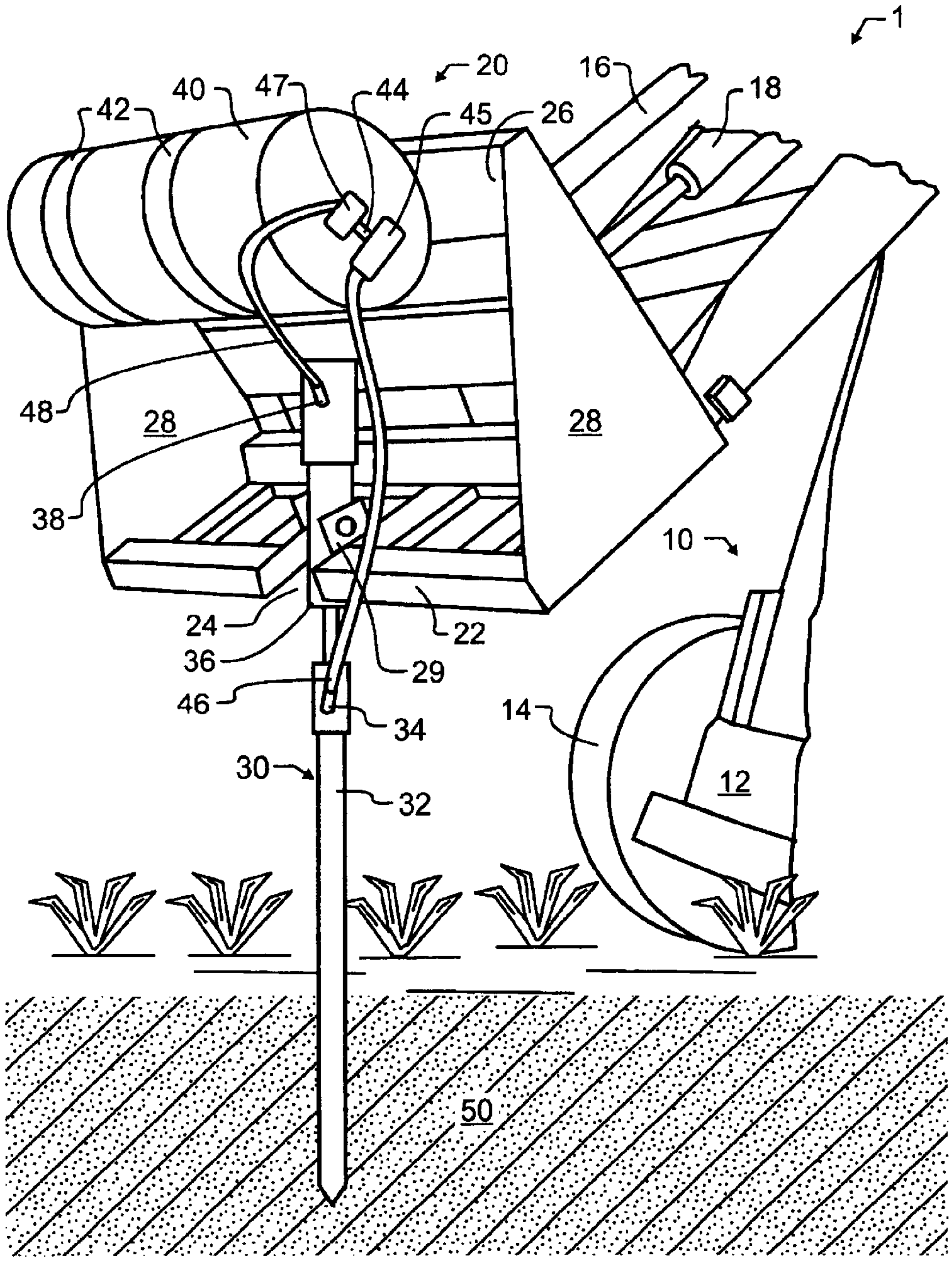
FIG. 1 illustrates a preferred embodiment combination skid steer and boom attachment from a projected plan view.

In a most preferred embodiment of the invention illustrated in FIG. 1, a soil aerating machine 1 includes in combination a small self-propelled vehicle 10 of the type adapted to manipulate and raise and lower a loader bucket, commonly referred to as a skid-steer, an air pressure tank 40, an elongate air nozzle tube or pipe 30, an air control valve 45, and an air hammer 36 used to assist with the driving of the elongate air nozzle pipe 30 into an earthen medium 50. In the preferred embodiment, air control valve 45 will be a low-voltage electrically controlled valve which may be actuated by movement of electric blast switch 4, which might typically be located within the operator's compartment or cage of self-propelled vehicle 10. Low voltage electrical actuation permits air control valve 45 to be driven from the electrical power normally available from a skid steer electrical system. Other techniques of actuating a valve, including in particular various pneumatic or hydraulic approaches that will utilize the sources of energy readily available with the preferred machine may be implemented as well.

Most preferably, valve 45 will actuate rapidly, to create a substantial impulse of air pressure and flow resembling an explosion of air pressure within air nozzle pipe 30. Fast activation will produce a wide-spread loosening of earth 50 far more consistently and with much better result than a slow and gradual increase in pressure and flow. Slow activation is unacceptable in the present application, since it will lead to unwanted channeling in earth 50, rather than widespread loosening. In this vein, the inclusion of air pressure tank 40 most nearly adjacent to air nozzle pipe 30 is highly preferred, since larger hose 46 may reasonably be used over this short distance and, owing to the short distance and larger hose diameter, there will be only minor restriction provided. Straps 42 or other method of anchoring may be provided to attach air pressure tank 40 to back wall 26 or at other suitable-location within attachment 20.

Adjacent the end of air nozzle pipe 30 closest to attachment base 22, in a position which in use will be above air nozzle pipe 30, is a pneumatic hammer 36. Pneumatic hammer 36 will most preferably act as a linear motor, alternately applying force on air nozzle pipe 30 and removing the force therefrom. This hammering effect greatly facilitates desired penetration of air nozzle pipe 30 into earth 50, and requires only a source of air available from the air tank and low power electricity available from the skid steer electrical system. Electricity is used in the preferred embodiment to control actuation of pneumatic hammer 36 remotely via an electrical hammer switch 3, but other techniques or alternatives to control such actuation may also be provided, as would be known in the control arts, including but not limited to pneumatic and other actuators. Air is provided from a distribution pipe 44 through electrically actuated valve 47 into hose 48, and finally to pneumatic hammer air inlet 38 to pneumatic hammer 36. While pneumatic hammer 36 is air powered in the preferred embodiment, it will be understood by those skilled in the art that other means of powering the hammer may also or alternatively be selected. Among these are of course hydraulically or electrically actuated hammers, in view of the ready availability of hydraulic and electrical connections on most skid steers. Furthermore, the use of an air conduit or pipe 44 common to both valve 45 and 47 may not be the most preferable arrangement, depending upon the size of pipe 44, the volumes of air required, and the like. Separate outlet ports may instead be provided in tank 40 for one or more of the various outlets and air inlets used in a particular design. Finally, where required or appropriate, either valve 45 or valve 47 may additionally include pressure regulators, flow controls, or other like components.

Pneumatic hammer 36 will most preferably be journalled to attachment base 22 through a pivotal mount 29, so that air nozzle pipe 30 may be driven into earth 50 at different angles relative to attachment base 22, as may be required or preferred during use. This permits the preferred attachment 20 to effect soil aeration at angles other than normal to the surface, the selection of the angle which is entirely under the control of an person. Consequently, when an obstacle or fixture must be avoided or circumnavigated, the present attachment 20 may still be used.

Figure 2:
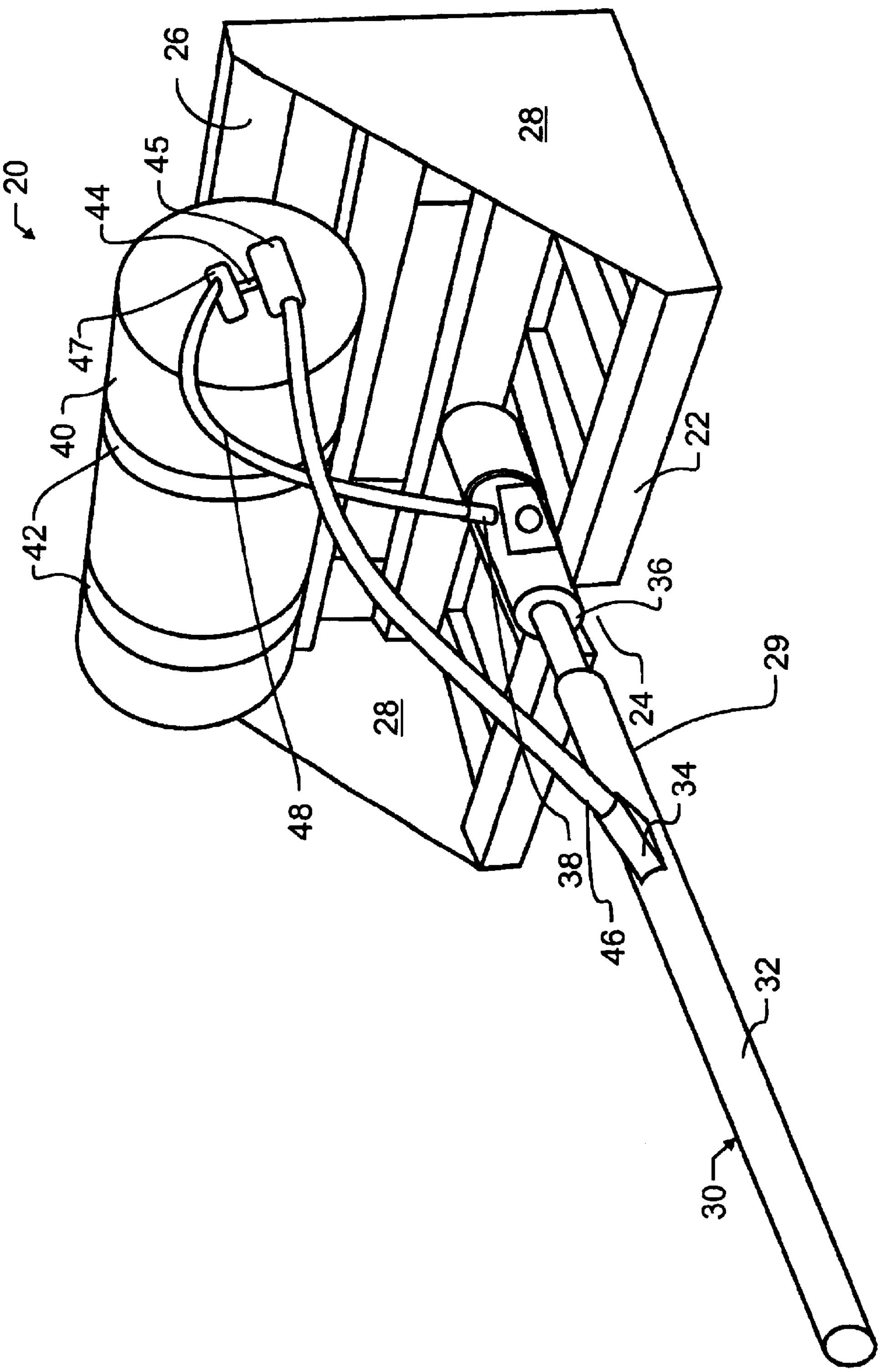
FIG. 2 illustrates the preferred boom attachment of FIG. 1 in a ground-resting position from a projected plan view.
Figure 3:
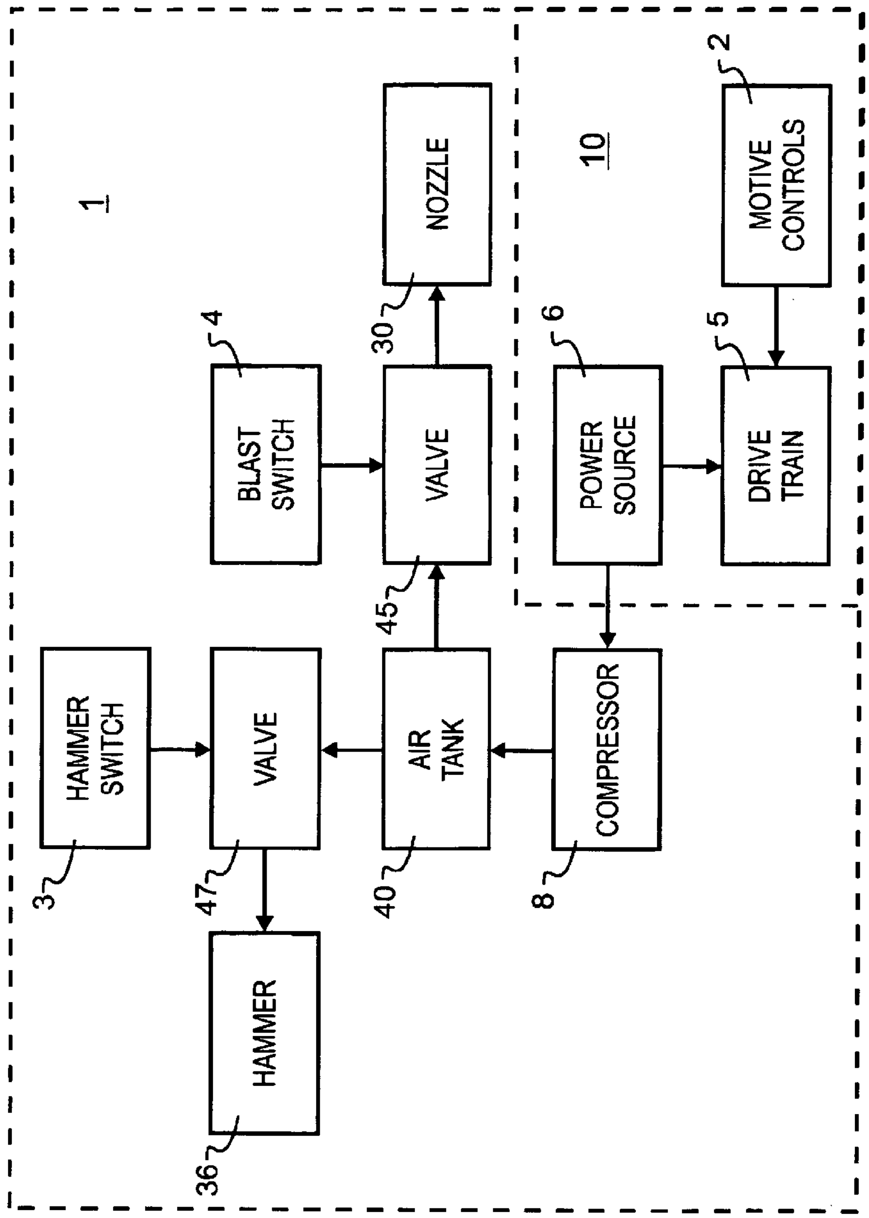
FIG. 3 illustrates by schematic block diagram the relationship of many of the components of the preferred embodiment.

Attachment 20 is, in the preferred embodiment, configured to resemble a typical loader bucket. This configuration permits ready attachment to a boom 16, with the typical manipulation of tilt between attachment 20 and boom 16 controllable with standard equipment such as hydraulic cylinder 18. Furthermore, attachment 20 may be rested upon base 20 as shown in FIG. 2 when not in use, enabling ready connection and disconnection from boom 16. Since attachment 20 is not intended for the storage or raising of material, base 22 may, though does not have to be, fabricated from an open framework. A gap 24 will preferably be provided therein which will accommodate both the placement and pivotal motion of pneumatic hammer 36. Back wall 26 is formed at a fairly conventional angle to permit the standard attachment and placement illustrated in FIG. 2 and described above, and sides 28 may be provided to add strength and rigidity, while also protecting the high pressure pneumatic components from unintended impact with foreign objects. As should be apparent, the shape and extent of these side walls 28, as well as the base 22, back wall 26, and gap 24, will all be selected by a designer in accord with the objectives of a particular design, and, as such, may vary greatly from the present illustrations.

This combination of components found in soil aerating machine 1 permits the mobile aeration of soil or earthen areas in a small and compact vehicle, which is of relatively low cost and which is commonly available to many users who may benefit from soil aeration. Soil aerating machine 1 may be readily transported from location to location upon a trailer or the like, or, when locations are relatively close, the preferred soil aerating machine 1 may be driven using the internal power plant 6 within self-propelled vehicle 10.

This preferred soil aerating machine 1 may be used for agricultural, horticultural or landscaping purposes, where the soil may, for exemplary purposes and not limited thereto, be loosened in preparation for planting. Once the soil is loosened by aeration, the formation of the hole, the penetration of moisture and nutrients, and the expansion of roots during future growth by the plant are each improved. Additionally, the present invention may be applied to the introduction of other solids, liquids or gases other than or in addition to air into the soil, or even mixtures thereof. A preferred application of soil aerating machine 1 is in the restoration or rejuvenation of a septic system drain field. In this application, the drain field will most preferably be marked to identify the location of drain pipes and other buried septic components. Self-propelled vehicle 10 will then be positioned between the pipes and buried components using motive controls 2 to control drive train 5 and thereby convert motive power from power source 6 into physical movement and positioning. When self-propelled vehicle 10 is properly positioned, elongate air nozzle pipe 30 is driven into earth 50 by actuating hammer switch 3, in turn actuating pneumatic hammer 36 through valve 47. Next, blast switch 4 is triggered, and air valve 45 is thereby activated to enable a high volume, high pressure blast of air to pass into air nozzle pipe 30. This blast of pressurized air will tend to loosen the adjacent soil, permitting improved drainage from the drain field, thereby restoring or extending the life of an existing drain field without requiring the expensive digging and replacement of the existing drain field. Because a typical drain field encompasses a large area, and will therefore require a large number of insertions and associated air blasts to adequately cover the entire land area within the field, a source of pressurized air will be required to maintain adequate pressure within air pressure tank 40. In one embodiment, a separate air hose may be provided and coupled to a source of high pressure air, such as an air compressor 8 or the like. In a second embodiment, power 6 provided from self-propelled vehicle 10, which may be mechanically, hydraulically, electrically or otherwise provided, may be used to drive air compressor 8, the output of which is then input into air pressure tank 40. When an air hose is used, air pressure tank 40 is not a necessity, but is strongly preferred. Air pressure tank 40 offers relatively consistent high pressure and large volumes of air without restriction. When a hose is used to deliver the large blasts of air, the hose diameter must be great to provide high volume relatively unrestricted. Since the pressures are also very high, such large diameter high pressure hose is extremely heavy, expensive, and very cumbersome to use. Furthermore, such hose may present an obstacle to the maneuvering of soil aerating machine 1. Consequently, air pressure tank 40 is most highly preferred, acting as an accumulator and storage receptacle for large volumes of high pressure air.

The relatively small size and moderate weight of a skid steer make such machine well suited for drain field restoration. A drain field may not be traversed with excessively heavy vehicles, since the subterranean components may become overloaded and collapse. Consequently, a smaller and more nimble machine offers significant advantage.

The preferred soil aerating machine may be manufactured from a variety of materials, including metals, resins and plastics, glasses, ceramics or cementitious materials, or even combinations of the above. The specific material used for the various components will vary in accord with the requirements of a particular design, as will be recognized by those skilled in the art.

A variety of designs have been contemplated for the soil aerating machine illustrated herein. For example, while the most preferred embodiment uses a support structure for the air tank, air hammer, valves and air nozzle pipe which resembles a loader bucket, other geometries and structures may be used Other variations are also contemplated herein with regard to alternative embodiments. Consequently, while the foregoing details what is felt to be the preferred and additional alternative embodiments of the invention, no material limitations to the scope of the claimed invention are intended. The possible variants that would be possible from a reading of the present disclosure are too many in number for individual listings herein, though they are understood to be included in the present invention. Further, features and design alternatives that would be obvious to one of ordinary skill in the art are considered to be incorporated also. The scope of the invention is set forth and particularly described in the claims hereinbelow.

I claim:

1. An soil aerating machine, comprising:

a loader having a wheeled base for traveling over earth, a motive power plant providing motive power to said wheeled base, a loader boom also driven by power derived from said motive power plant and operatively moveable with respect to said wheeled base, and means for operatively attaching loader buckets and other attachments to said loader boom;

a source of pressurized air;

a pneumatic pressure tank having an inlet receiving pressurized air from said pressurized air source and having an outlet;

an air nozzle having an air inlet receiving pressurized air from said pneumatic pressure tank and having an air outlet that is operatively inserted into the earth and being operative to conduct said pressurized air from said air inlet into said earth adjacent said air outlet; and a basket coupled to said attaching means and supporting said air nozzle.

2. The soil aerating machine of claim 1 further comprising a pneumatic hammer for driving said air nozzle into the earth, said pneumatic hammer journalled to said basket and supporting said nozzle therefrom.

3. The soil aerating machine of claim 1, wherein said air nozzle is coupled to said basket and moveable relative thereto.

4. The soil aerating machine of claim 3, wherein said air nozzle has an axis of rotation perpendicular to said air nozzle and transverse to said loader.

5. The soil aerating machine of claim 1, wherein said basket further comprises a base, a generally angularly offset back wall, and two side walls.

6. The soil aerating machine of claim 5, wherein said generally angularly offset back wall is attached to said boom.

7. The soil aerating machine of claim 1, wherein said pneumatic pressure tank is supported by said basket.

8. The soil aerating machine of claim 1, wherein said source of pressurized air further comprises an air line coupled to a remote compressor.

9. The soil aerating machine of claim 1, wherein said source of pressurized air further comprises an air compressor deriving power from motive power plant.

10. The soil aerating machine of claim 1, wherein said loader further comprises a front-end loader.

11. The soil aerating machine of claim 10, wherein said front-end loader further comprises a skid steer.

12. A self-propelled land vehicle having a motive power source, a base, a boom arm, and a coupling connected to said boom arm to which attachments may be engaged, wherein the improvement comprises:

an air tube pivotally coupled to said boom arm adjacent a first end and insertable into the earth at a second end distal to said first end;

an air tank supported by said boom arm and adjacent said air tube;

a means for providing a high pressure, high volume impulse of air to said air tube;

a means for controlling an extent of insertion of said air tube into the earth; and a means for controlling the providing of said high pressure, high volume impulse of air to said air tube.

13. The self-propelled land vehicle of claim 12, further comprising a pneumatic hammer having a work axis axially aligned with an air tube longitudinal axis.

14. A method of restoring a septic system comprising the steps of:

locating buried septic components;

coupling a gas injection tube to a loader boom arm;

inserting said gas injection tube into the earth adjacent said located buried septic components;

mounting an air pressure tank on a basket coupled to said loader boom arm, and thereby providing a high pressure gas to said gas injection tube;

withdrawing said gas injection tube from the earth;

repositioning said loader boom arm to a new position adjacent said located buried septic components; and repeating said inserting, providing, and withdrawing steps subsequent to said repositioning step.

15. The method of restoring a septic system of claim 14, further comprising the step of engaging a power driver with said gas injection tube.

16. The method of restoring a septic system of claim 15, wherein said power driver further comprises an air hammer.

17. The method of restoring a septic system of claim 14, wherein said coupling is pivotal.

* * * * *